US007495214B2

(12) United States Patent
Pan et al.

(10) Patent No.: US 7,495,214 B2
(45) Date of Patent: Feb. 24, 2009

(54) SYSTEMS AND METHODS FOR MATERIAL AUTHENTICATION

(75) Inventors: David H. Pan, Rochester, NY (US); Santokh S. Badesha, Pittsford, NY (US); Randall R. Hube, Rochester, NY (US); David J. Gervasi, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/726,239

(22) Filed: Mar. 21, 2007

(65) Prior Publication Data

US 2008/0230719 A1 Sep. 25, 2008

(51) Int. Cl.
*G01N 21/64* (2006.01)
*G01V 15/00* (2006.01)

(52) U.S. Cl. .................................................... 250/302
(58) Field of Classification Search .................. 250/302
See application file for complete search history.

(56) References Cited

U.S. PATENT DOCUMENTS

| | | | | |
|---|---|---|---|---|
| 4,929,983 | A | 5/1990 | Barton et al. | |
| 5,045,890 | A | 9/1991 | DeBolt et al. | |
| 5,166,031 | A | 11/1992 | Badesha et al. | |
| 5,389,958 | A | 2/1995 | Bui et al. | |
| 5,424,841 | A * | 6/1995 | Van Gelder et al. | 356/417 |
| 5,736,250 | A | 4/1998 | Heeks et al. | |
| 5,805,191 | A | 9/1998 | Jones et al. | |
| 6,002,893 | A | 12/1999 | Caruthers, Jr. et al. | |
| 6,176,575 | B1 | 1/2001 | Crawford et al. | |
| 6,677,584 | B2 * | 1/2004 | Yonushonis | 250/302 |
| 6,733,839 | B2 | 5/2004 | Badesha et al. | |
| 6,876,832 | B2 | 4/2005 | Pirwitz et al. | |
| 2006/0186348 | A1 * | 8/2006 | Nguyen et al. | 250/484.4 |

FOREIGN PATENT DOCUMENTS

JP 10142984 A * 5/1998

* cited by examiner

*Primary Examiner*—Constantine Hannaher
(74) *Attorney, Agent, or Firm*—Pillsbury Winthrop Shaw Pittman LLP

(57) ABSTRACT

Systems and methods for authentication of materials used in imaging members and assemblies. Authentication of imaging materials ensure that compatible components are being used with the imaging members and assemblies. Embodiments provide a system and method for efficiently detecting whether materials being used in the imaging members and assemblies are compatible and authentic materials authorized for such uses.

16 Claims, 3 Drawing Sheets

FIG. 1
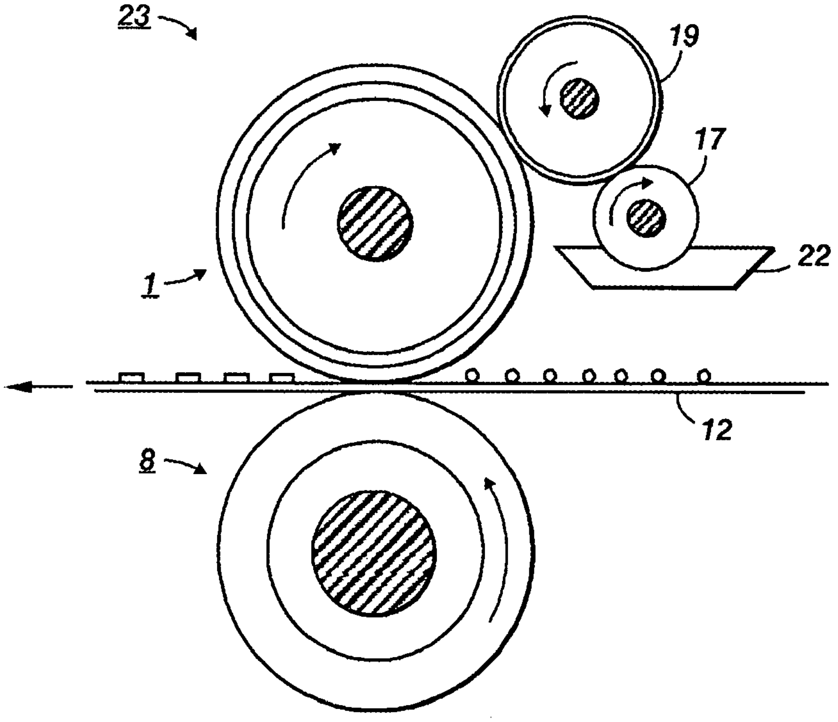
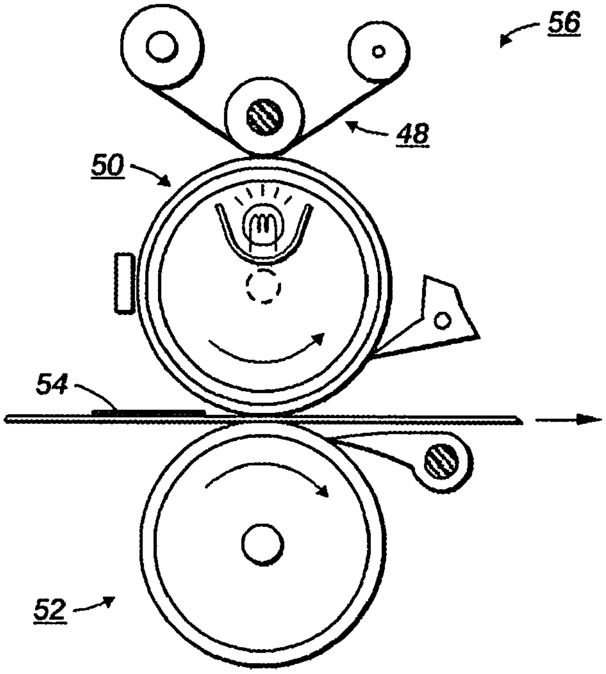
FIG. 2

FIG. 3A
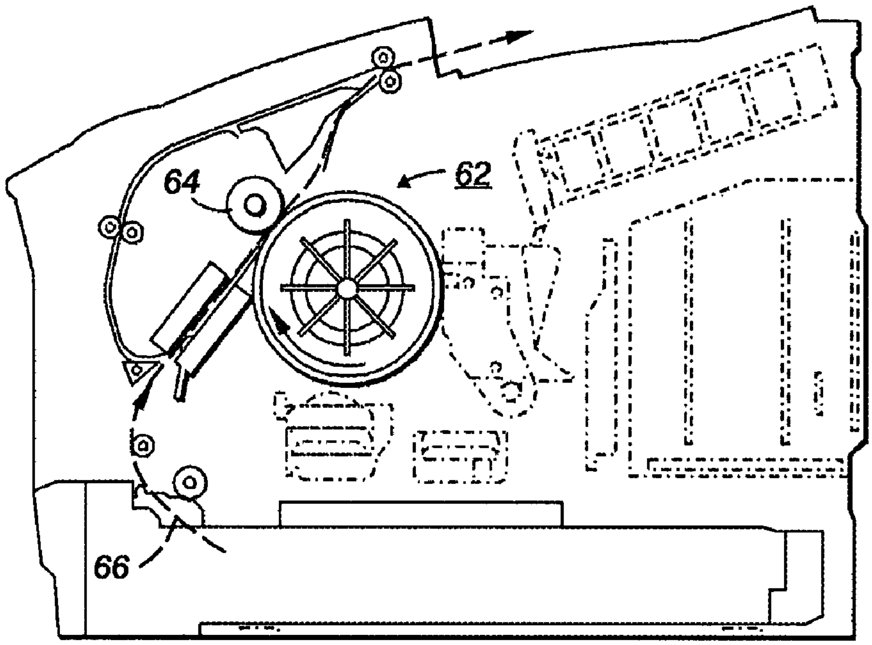
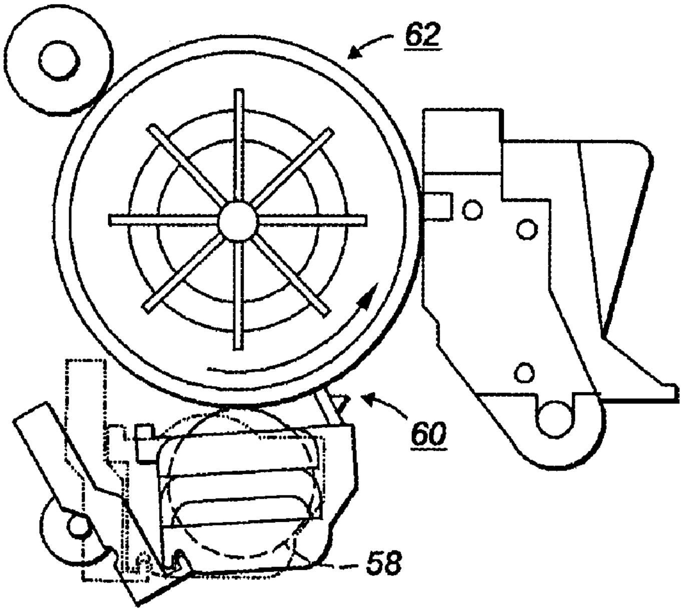
FIG. 3B

SYSTEMS AND METHODS FOR MATERIAL AUTHENTICATION

CROSS REFERENCE TO RELATED APPLICATIONS

Reference is made to copending, commonly assigned U.S. patent application to Pan et al., filed Mar. 21, 2007, entitled, "Systems and Methods for Material Authentication" (Ser. No. 11/726,215), and copending, commonly assigned U.S. patent application to Pan et al., filed Mar. 21, 2007, entitled, "Systems and Methods for Material Authentication" (Ser. No. 11/726,212).

BACKGROUND

Herein disclosed are embodiments generally relating to imaging members and assemblies and the authentication of specific material components used in the imaging members and assemblies. The disclosed embodiments may be used in various printing systems, such as for example, in phase change or solid ink jet printing systems or electrophotographic printing systems. Authentication of the materials ensures that compatible components are being used with the imaging members and assemblies. More specifically, the embodiments disclose a system and method for efficiently detecting whether materials being used in the imaging members and assemblies are compatible and authentic materials authorized for such uses.

Manufacturers of the various imaging members and assemblies produce materials and components specific for use with these imaging members and assemblies. The materials are tailored to each member or assembly for optimal performance. A problem arises when materials, used in the imaging members and assemblies, not authorized by the manufacturers are substituted for the authentic counterparts. Use of these unauthentic materials causes compatibility issues and has a significant negative impact on the imaging business and reputation of the manufacturers. The unauthentic materials often are not as compatible with the imaging member or assembly as advertised and subsequently introduce operational problems that negatively impact machine performance. Such problems lead to higher maintenance costs, increased down-time, and the like. These type of problems in turn lead to lower customer satisfaction with the imaging members and assemblies.

Previous attempts to devise a monitoring system with which to determine the authenticity of imaging materials were problematic in that the systems did not provide easy detection of the unauthentic or unauthorized materials involved. The systems generally did not detect the unauthentic materials until after an extended period of problematic behavior raised suspicions, and subsequently involved obtaining samples from the dissatisfied customer and conducting extensive and costly laboratory analysis to determine authenticity.

As such, the previous attempts did not yield an effective way in which to deal with the issue of unauthentic materials. Therefore, there is a need for a way in which to efficiently detect the presence of unauthentic materials used in an imaging member or assembly without taking up a large amount of time and resources.

The term "electrostatographic" is generally used interchangeably with the term "electrophotographic."

BRIEF SUMMARY

According to embodiments illustrated herein, there is provided a system and method for more efficiently detecting whether materials being used in the imaging members and assemblies are compatible and authentic materials authorized for such uses.

In particular, an embodiment provides a method for authenticating an imaging material used in an ink jet printing apparatus, comprising tagging an imaging material with at least one fluorescent tag, generating an energy source for stimulating an emission of fluorescent light from the fluorescent tagged imaging material, stimulating the emission of fluorescent light from the fluorescent tagged imaging material, measuring the emission of fluorescent light from the fluorescent tagged imaging material at a predetermined wavelength, and identifying a test imaging material as authentic when the measured emission of fluorescent light from the test imaging material meets a predetermined emission of fluorescent light from the fluorescent tagged imaging material at the predetermined wavelength.

In another embodiment, there is provided an imaging material comprising a drum maintenance fluid and at least one fluorescent tag. In specific embodiments, the imaging material is prepared for use with the above described method. For example, the imaging material is prepared to be identified as authentic by the above described method.

Further embodiments provide a system for authenticating an imaging material used in an ink jet printing apparatus, comprising at least one fluorescent tag for tagging an imaging material, an energy source for stimulating an emission of fluorescent light from the fluorescent tagged imaging material, and a fluorescent detector for measuring the emission of fluorescent light from the fluorescent tagged imaging material at a predetermined wavelength, wherein the fluorescent detector includes an indicator for identifying a test imaging material as authentic when the measured emission of fluorescent light from the test imaging material meets a predetermined emission of fluorescent light from the fluorescent tagged imaging material at the predetermined wavelength.

BRIEF DESCRIPTION OF THE DRAWINGS

For a better understanding of the present invention, reference may be had to the accompanying figures.

FIG. 1 is a cross-sectional view of a fusing system;

FIG. 2 is a cross-section view of a web-cleaning fusing system;

FIG. 3A is a cross-sectional view of a transfix system with an image on the drum surface being transfixed to a sheet of final substrate by passing through the transfix nip;

FIG. 3B is a cross-sectional view of a drum maintenance (DM) and imaging cycle.

DETAILED DESCRIPTION

Figure 4:
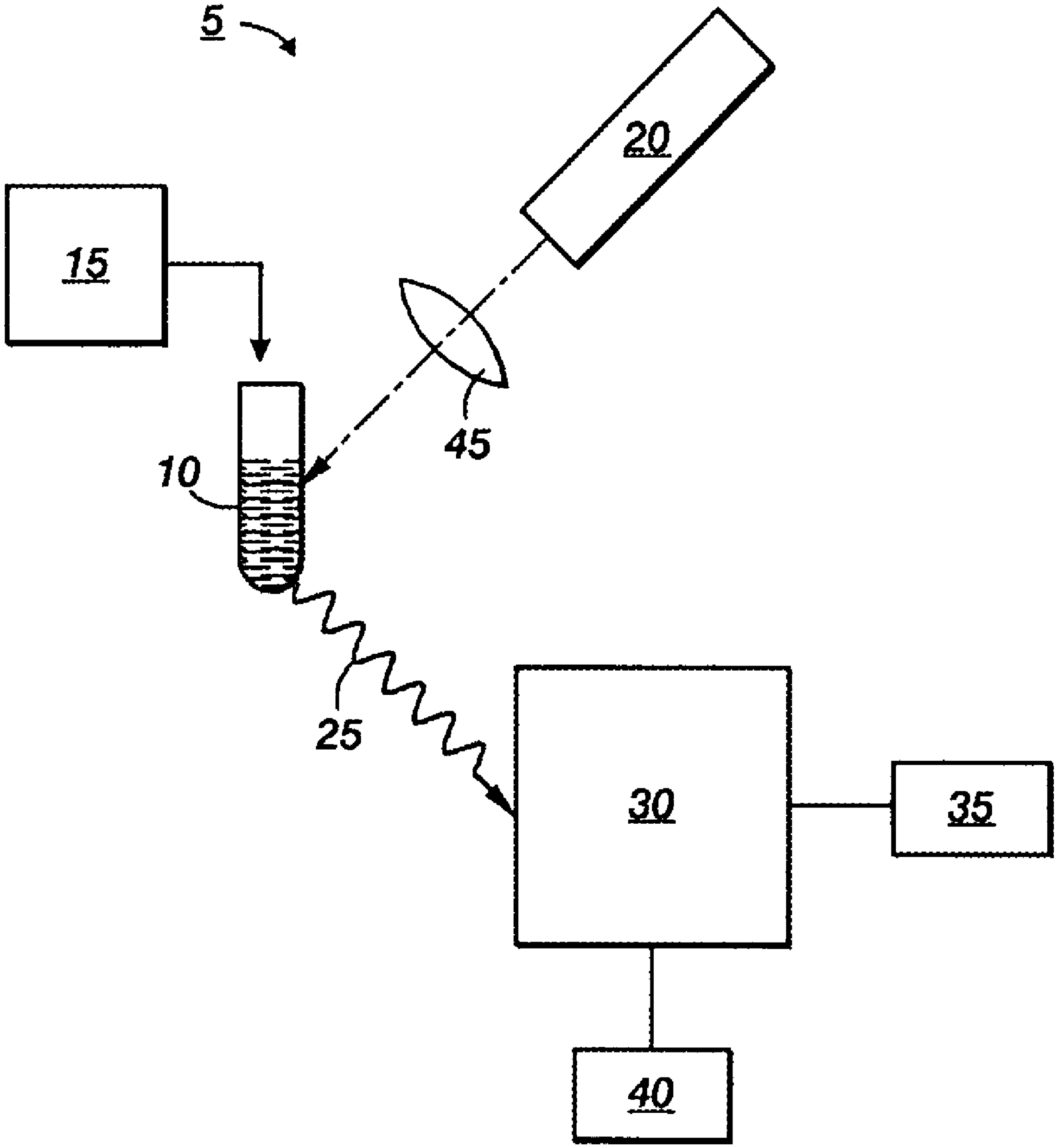
FIG. 4 is a schematic block diagram of a system for authenticating a material for use in imaging systems according to an embodiment of the present disclosure.

In the following description, it is understood that other embodiments may be utilized and structural and operational changes may be made without departure from the scope of the present embodiments disclosed herein.

The present embodiments provide a system and method for detecting the presence of unauthentic materials used in imaging apparatuses in a time and cost-efficient manner. The present embodiments propose to incorporate at least one chemical tag in specific imaging materials that can be traced online or offline. The incorporated tags do not affect the performance of the imaging materials. In embodiments, the tag molecule is a fluorescent tag that is detected by fluorescence. In further embodiments, the tag is colorless in order to broaden the tag concentration latitude.

Use of a fluorescent tag for identification is known in the biotechnological field. For example, such tags have been used as part of a molecule that researchers have chemically attached to aid in the detection of the molecule to which it has been attached. The fluorescent molecule is also known as a fluorophore.

Use of similar tags have also been introduced into toner particles for use in custom color control techniques, as disclosed in U.S. Pat. No. 6,002,893, which is hereby incorporated by reference in its entirety. The disclosure teaches a novel sensor adapted to sense fluorescent molecules in the toner particles to provide a color independent measure of total toner solids.

The present embodiments, the imaging materials include any materials that are used in various imaging systems known in the art. For example, specific embodiments described herein include adding a tag molecule in small quantities into imaging materials used in piezoelectric ink jet (PIJ) and solid ink jet (SIJ) printing systems as well as electrostatographic materials used in xerographic systems for monitoring and evaluating authenticity. In one embodiment, the tag can be incorporated into fusing system materials and components generally used in electrostatographic printing systems, such as the fuser fluid. Typical fusing systems are described in U.S. Pat. Nos. 5,166,031, 5,736,250, and 6,733,839, which are hereby incorporated by reference in their entirety. As can be seen in FIG. 1, the fuser fluid or fuser release oil can be present in several locations throughout the fusing system 23, for example, in the fluid sump 22, on the surfaces of the metering roll 17, donor roll 19, fuser roll 1, pressure roll 8, and ultimately on the media 12 passing through the fusing system 23. The fuser fluid to be evaluated can be obtained from any of these locations. Other embodiments include incorporating the tag into fuser web-cleaning system materials and components, such as the fuser lubricant, or incorporating the tag into drum maintenance materials and components in a transfix system, such as the drum maintenance fluid. Typical web-cleaning fusing systems are described in U.S. Pat. Nos. 4,929,983, 5,045,890, and 6,876,832, which are hereby incorporated by reference in their entirety. Web-cleaning fusing systems are generally used in, but not limited to, electrostatographic printing systems. Typical transfix systems are described in U.S. Pat. Nos. 5,389,958, 5,805,191, and 6,176,575, which are hereby incorporated by reference in their entirety. Transfix systems are typically used in piezoelectric ink jet or solid ink jet printing systems.

As seen in FIG. 2, the fuser lubricant can be present in many locations in the web-cleaning system 56, for example, the cleaning web 48, fuser roll 50, pressure roll 52, and ultimately on the media 54 passing through the web-cleaning fusing system 56. The fuser lubricant to be evaluated can be obtained from any of these locations. Likewise, the drum maintenance fluid can be present in several locations throughout the drum maintenance system, as shown in FIGS. 3A and 3B, including the surface of the drum maintenance roller 58, metering blade 60, drum surface 62, transfix roller 64, and ultimately on the print media 66 passing through the transfix system. Again, the drum maintenance fluid to be evaluated can be obtained from any of these locations.

In embodiments, the imaging material comprises a drum maintenance fluid and at least one fluorescent tag. In a specific embodiment, the imaging material is prepared for use with the system and methods described herein. For example, the imaging material is prepared to be identified as authentic by the system and methods. The tag comprises a fluorescence or scintillation chemical. Fluorescent or scintillating materials are those materials exhibiting fluorescence while being acted upon by radiant energy such as ultraviolet (UV) rays or X-rays. Suitable materials may be solid or liquid, organic or inorganic, and include, for example, any well-known fluorescent crystals or fluorescent dyes. As previously mentioned, fluorescent dyes have been typically used in tagging molecules in chemical or biochemical research.

Any known fluorescent dyes may be used. Suitable dyes include, for example, fluorescein, rhodamine, rosaline, uranium europium, uranium-sensitized europium, and mixtures thereof. Organic compounds may also be used. Those that have been tested to be solvent compatible with fuser fluids include poly(methylphenyl siloxane), 1,4-Bis(4-methyl-5-phenyloxazol-2-yl)benzene, 1,4-Bis(5-phenyl oxazol-2-yl) benzene, 2,5-diphenyl oxazole, 1,4-Bis(2-methylstyryl)benzene, trans-4,4'-diphenyl stilbebene, 9,10-diphenyl anthracene, and mixtures thereof. Positions of the fluorescence band for toluene range from about 350 nm to about 420 nm while being radiated with ultraviolet rays having wavelengths of 365 nm. In addition, the present embodiments also contemplate using fluorescence tags which can fluoresce in all different visible colors, namely from about 350 nm to about 700 nm.

In embodiments, the fluorescent material is capable of exhibiting fluorescence in small amounts. Consequently, the fluorescent tag can be added in small amounts to the imaging material without altering the properties or performance of the tagged material. The present embodiments provide for a fluorescent tag that is present in the tagged imaging material in an amount of from about 0.001 to about 10,000 ppm, in an amount of from about 0.001 to about 1,000 ppm, or in an amount from about 0.01 to about 100 ppm.

Methods used to "treat" or incorporate the fluorescent tag into the imaging material, may be physical in nature, chemical in nature or a combination of both. For example, a physical treatment method may involve simple mixing of the fuser fluid with the fluorescent material, or a chemical treatment method may involve bonding the fluorescent tag to the fuser fluid by any suitable technique. If the tag comprises a fluorescent material that is not sufficiently soluble in the tagged material, the insolubility can be addressed by modifying the molecule with a moiety compatible with the tagged material. In one embodiment, for increasing the solubility of a fluorescent tag in fuser fluid, the moiety is a short silicone chain.

In embodiments, a method for authenticating an imaging material, comprises tagging an imaging material with the fluorescent tag described above, and measuring the level of fluorescence emitted. An energy source, such as radiant energy, is generated and directed to a material to be assessed for authenticity. The energy source will stimulate an emission of fluorescent light from the fluorescent tag if the evaluated material contains one. Any fluorescence that is stimulated from the evaluated imaging material is measured. The measurement may be set at a predetermined wavelength that is set to only pick up fluorescence from the authentic imaging materials. Fluorescence that meets the predetermined values is identified as authentic. Furthermore, the method may include subjecting the emission of fluorescent light from the imaging material to a filter to remove background fluorescence or interference before measuring the emission of fluorescent light from the material at the predetermined wavelength.

In further embodiments, as shown in FIG. 4, a system 5 for authenticating an imaging material 10 obtained from an imaging assembly 15 is provided. The system comprises a fluorescent tag used to tag imaging materials used in the imaging assembly. The system provides an energy source 20 for stimulating an emission 25 of fluorescent light from the imaging material 10, and a fluorescent detector 30 for measuring the emission 25 of fluorescent light from the imaging material 10 at a predetermined wavelength. In addition to the commonly used UV illumination systems, the energy source 20 could be a cost-effective UV light emitting diode (LED). For example, such a UV LED may have a peak emission wavelength of 365 nm and a narrow spectrum half width, e.g., 10 nm. The fluorescent detector 30 includes an indicator 35 for identifying the evaluated imaging material 10 as authentic when the measured emission 25 of fluorescent light, if any, from the imaging material 10 meets the predetermined wavelength. The indicator 35 may be a part of the detector 30, for example, a display screen disposed on the detector. The indicator 35 may also be a separate component not attached to the detector, for example, a remote personal computer that remotely communicates with the detector 30 via a wired or wireless network. In embodiments, the fluorescent detector 30 detects light within a visible spectrum. In further embodiments, the detector 30 comprises multiple sensors. In certain arrangements, where the sensors (and their filters) are placed in close proximity to the tagged material, the detector are able to detect the fluorescence of the material without additional optics. However, if other considerations force the detectors to be placed at some distance from the tagged material, then it may be advantageous to also include collection optics between the material being tested and the detector to gather and focus the fluorescent light from the tested material onto the detector(s).

In addition, the system 5 may further include a smart chip 40 coupled to the fluorescence detector 30 for requesting replacement of the evaluated material when the material is not authentic. An optical filter 45 may be included in the system 5 to remove background fluorescence or interference that may be involved in the evaluation of the imaging material 10. Such filters may include, for example, an acousto-optic tunable filter, a fiber tunable filter, a thin-film interference filter, or an optical band-pass filter. Thin-film filters may be interference filter wheels or interference filter turrets. In further embodiments, a "digital" filter may be used to distinguish fluorescence from the fluorescent tag from that of other interferences or contaminants that may also cause a test imaging material to fluoresce. Digital filtering involves measuring fluorescent intensity in a range of wavelength. A plot of intensity versus wavelength shows peaks, each being characterized by a set of fluorescent parameters (e.g., fluorescent wavelength, intensity, and full width at half maximum (FWHM)). By comparing these parameters, one can isolate the fluorescent parameter unique to the specific tag. For example, among the superimposed intensity curve, only one peak is due to the fluorescent tag. Thus, by fitting the entire intensity curve with peaks identified for each of the fluorescent parameters associated with the tag (fluorescent wavelength, intensity, and FWHM), the digital modeling process can be used to distinguish the fluorescent tag from the other fluorescent interferences/contaminants.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLE

The example set forth herein below and is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter.

Example 1

A typical fusing system (e.g., electrostatographic printing system), includes a fuser roll, a pressure roll, a printing medium, an image, a metering roll, a donor roll, a release agent sump, and a fuser fluid or fuser release oil. In this example, the fuser fluid is treated with a fluorescent tag.

An ultraviolet lamp is radiated onto the fluorescent tagged fuser fluid in the sump, and fluorescence intensity is measured as a function of wavelength. The measured fluorescence spectrum is then fit to a model in which the model parameters are compared with predetermined values, for example, predetermined wavelengths, stored in a fluorescence detection device. The fuser fluid is authenticated if the model parameters meet the stored values.

As the model parameters are dependent on the location of the detection, for example, where in the fusing system the tested fuser fluid is obtained from, and thereby the parameters are dependent on the amount and temperature of the fuser fluid.

Example 2

A typical solid ink jet (SIJ) printing system includes a drum maintenance and imaging cycle. An image on the drum surface is transfixed to a sheet of final substrate by passage through the transfix nip. The drum maintenance roller then cleans and applied drum maintenance fluid to the drum before the image is jetted. In this example, the drum maintenance fluid is treated with a fluorescent tag. Poly(methylphenyl siloxane), which is readily soluble in typical silicone-based drum maintenance fluids, may be used as the fluorescent tag molecule in this example.

An ultraviolet lamp is radiated on the fluorescent tagged drum maintenance fluid in the drum maintenance system. The fluorescence intensity is measured as a function of wavelength. The measured fluorescence spectrum is then fit to a model in which the model parameters are compared with predetermined values, for example, predetermined wavelengths, stored in a fluorescence detection device. The drum maintenance fluid is authenticated if the model parameters meet the stored values.

As the model parameters are dependent on the location of the detection, for example, where in the drum maintenance system the tested drum maintenance fluid is obtained from, and thereby the parameters are dependent on the amount and temperature of the drum maintenance fluid.

Fluoranthene (99%), available from Sigma-Aldrich Co. (St. Louis, Mo.) and fluorescent clear blue dye (Invisible Blue), available from Risk Reactor (Huntington Beach, Calif.), were tested as fluorescent tags. It was noted that fluoranthene (99%) was soluble in a variety of organic solvents, and miscible in silicone, while fluorescent clear blue dye had limited solubility in methyl ethyl ketone (MEK).

The fluoranthene (99%) and fluorescent clear blue dye were first dissolved in appropriate solvents and then added directly to SIJ silicone fluid for evaluation of fluorescent tag effectiveness. The following samples were used in the evaluation: (1) 5 g of drum maintenance fluid alone, (2) 5 g of drum maintenance fluid with 0.2 g of 5% fluoranthene in acetone (0.2% of fluoranthene), and (3) 5 g of drum maintenance fluid with 0.2 g of 5% fluorescent clear blue dye in MEK (0.2% of DFSB-C0).

Ten drops, or approximately 80 mg were spin-coated onto two-inch square 304V stainless steel plates and two-inch square card-stock paper samples. Small drops were placed directly onto a fourth stainless steel plate for comparative evaluation. The samples were evaluated for visibility of the tag in the sample under a black light. Fluorescence of the fluorescent tags in silicone oil showed good visibility.

It was further noted that the paper substrate also fluoresces under black light. Thus, using proper filtering techniques before imaging fluorescence signals in the samples would amplify the differences in fluorescence signal between the control sample and samples with fluorescent tags.

Example 3

A typical web-cleaning fusing system (e.g., electrostatographic printing system) includes a fuser roll having a TEFLON outer layer. Such a fuser roll generally does not require a fuser release agent. Although the TEFLON outer layer has a very low surface energy (thereby having sufficient release properties), it is still desirable to use a cleaning web for removal of paper dust or a very small quantity of residual toner on the surface. The cleaning web is largely improved by impregnated lubricant, such as silicone oil. In this example, the fuser lubricant is treated with a fluorescent tag.

An ultraviolet lamp is radiated on the fluorescent tagged drum fuser lubricant in the web-cleaning fusing system. The fluorescence intensity is measured as a function of wavelength. The measured fluorescence spectrum is then fit to a model in which the model parameters are compared with predetermined values, for example, predetermined wavelengths, stored in a fluorescence detection device. The evaluated fuser lubricant is authenticated if the model parameters meet the stored values.

As the model parameters are dependent on the location of the detection, for example, where in the web-cleaning fusing system the tested fuser lubricant is obtained from, and thereby the parameters are dependent on the amount and temperature of the fuser lubricant.

All the patents and applications referred to herein are hereby incorporated by reference in their entirety in the instant specification.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for authenticating an imaging material used in an ink jet printing apparatus, comprising:

tagging a drum maintenance fluid with at least one fluorescent tag, the at least one fluorescent tag being selected from the group consisting of fluoranthene, fluorescent clear blue dye, and mixtures thereof, and the at least one fluorescent tag being present in an amount of about 0.2 g in 5 g of the drum maintenance fluid;

generating an energy source for stimulating an emission of fluorescent light from the fluorescent tagged drum maintenance fluid;

stimulating the emission of fluorescent light from the fluorescent tagged drum maintenance fluid;

measuring the emission of fluorescent light from the fluorescent tagged drum maintenance fluid at a predetermined wavelength;

subjecting the stimulated emission of fluorescent light from the fluorescent tagged drum maintenance fluid to a filter to remove background interference before measuring the emission of fluorescent light from the fluorescent tagged drum maintenance fluid at the predetermined wavelength; and identifying a test drum maintenance fluid as authentic when the measured emission of fluorescent light from the test drum maintenance fluid meets a predetermined emission of fluorescent light from the fluorescent tagged drum maintenance fluid at the predetermined wavelength after filtering.

2. The method of claim 1 , wherein the drum maintenance fluid is obtained from a location in a transfix system selected from the group consisting of a drum maintenance roller, a metering blade, a drum surface, a transfix roller, and a media passing through the transfix system.

3. The method of claim 1 further including modifying the fluorescent tag with a chemical moiety compatible with the drum maintenance fluid so that the fluorescent tag is soluble in the imaging material.

4. The method of claim 1, wherein the fluorescent tag further comprises a dye selected from the group consisting of fluorescein, rhodamine, rosaline, uranium europium, uranium-sensitized europium, and mixtures thereof.

5. The method of claim 1, wherein the fluorescent tag further comprises an organic compound selected from the group consisting of poly(methylphenyl siloxane), 1,4-Bis(4-methyl-5-phenyloxazol-2-yl) benzene, 1,4-Bis(5-phenyl oxazol-2-yl) benzene, 2,5-diphenyl oxazole, 1,4-Bis(2-methylstyryl) benzene, trans-4,4'-diphenyl stilbebene, 9,10-diphenyl anthracene, and mixtures thereof.

6. The method of claim 1, wherein the energy source is selected from the group consisting of ultraviolet rays, X-rays, and mixtures thereof.

7. An imaging material comprising a drum maintenance fluid and at least one fluorescent tag prepared to be identified by the method of claim 1.

8. A system for authenticating an imaging material used in an ink jet printing apparatus, comprising:

at least one fluorescent tag for tagging a drum maintenance fluid, the at least one fluorescent tag being selected from the group consisting of fluoranthene, fluorescent clear blue dye, and mixtures thereof, and the at least one fluorescent tag being present in an amount of about 0.2 g in 5 g of the drum maintenance fluid;

an energy source for stimulating an emission of fluorescent light from the fluorescent tagged drum maintenance fluid;

a filter for removing background interference from the emission of fluorescent light from the fluorescent tagged drum maintenance fluid before measuring the emission of fluorescent light from the fluorescent tagged drum maintenance fluid at the predetermined wavelength; and a fluorescent detector for measuring the emission of fluorescent light from the fluorescent tagged drum maintenance fluid at a predetermined wavelength, wherein the fluorescent detector includes an indicator for identifying a test drum maintenance fluid as authentic when the measured emission of fluorescent light from the test drum maintenance fluid meets a predetermined emission of fluorescent light from the fluorescent tagged drum maintenance fluid at the predetermined wavelength after filtering, further wherein the fluorescent detector comprises multiple sensors.

9. The system of claim 8 further including a smart chip coupled to the fluorescence detector for requesting replacement of the test drum maintenance fluid when the test drum maintenance fluid is not authentic.

10. The system of claim 8, wherein the drum maintenance fluid is obtained from a location in a transfix system selected from the group consisting of a drum maintenance roller, a metering blade, a drum surface, a transfix roller, and a media passing through the transfix system.

11. The system of claim 8, wherein the fluorescent tag is modified with a chemical moiety compatible with the imaging material so that the fluorescent tag is soluble in the drum maintenance fluid.

12. The system of claim 8, wherein the fluorescent tag further comprises a dye selected from the group consisting of fluorescein, rhodamine, rosaline, uranium europium, uranium-sensitized curopium, and mixtures thereof.

13. The system of claim 8, wherein the fluorescent tag further comprises an organic compound selected from the group consisting of poly(methylphenyl siloxane), 1,4-Bis(4-methyl-5-phenyloxazol-2-yl) benzene, 1,4-Bis(5-phenyl oxazol-2-yl) benzene, 2,5-diphenyl oxazole, 1,4-Bis(2-methylstyryl) benzene, trans-4,4'-diphenyl stilbebene, 9,10-diphenyl anthracene, and mixtures thereof.

14. The system of claim 8, wherein the energy source is selected from the group consisting of ultraviolet light, X-ray, and mixtures thereof.

15. The system of claim 8, wherein the fluorescent detector detects light within a visible spectrum.

16. A method for authenticating an imaging material used in an ink jet printing apparatus, comprising:

tagging a drum maintenance fluid with at least one fluorescent tag, the at least one fluorescent tag being selected from the group consisting of fluoranthene, fluorescent clear blue dye, and mixtures thereof, and the at least one fluorescent tag being present in an amount of about 0.2 g in 5 g of the drum maintenance fluid;

generating an energy source for stimulating an emission of fluorescent light from the fluorescent tagged drum maintenance fluid;

stimulating the emission of fluorescent light from the fluorescent tagged drum maintenance fluid;

measuring the emission of fluorescent light from the fluorescent tagged drum maintenance fluid at a predetermined wavelength;

subjecting the stimulated emission of fluorescent light from the fluorescent tagged drum maintenance fluid to a filter to remove background interference before measuring the emission of fluorescent light from the fluorescent tagged drum maintenance fluid at the predetermined wavelength, wherein the filter is selected from the group consisting of an acousto-optic tunable filter, a fiber tunable filter, a thin-film interference filter, an optical bandpass filter, and a digital filter; and identifying a test drum maintenance fluid as authentic when the measured emission of fluorescent light from the test drum maintenance fluid meets a predetermined emission of fluorescent light from the fluorescent tagged drum maintenance fluid at the predetermined wavelength after filtering.

* * * * *